(12) United States Patent
Dougherty et al.

(10) Patent No.: US 10,235,280 B2
(45) Date of Patent: Mar. 19, 2019

(54) AUTOMATED SCRIPT CREATION AND SOURCE CODE GENERATION FOR TESTING MOBILE DEVICES

(71) Applicant: FMR LLC, Boston, MA (US)

(72) Inventors: Tom Dougherty, Merrimack, NH (US); John Michael Amadeo, Mont Vernon, NH (US); Mustufa Kalyanwalla, Morrisville, NC (US); Naveen Arasu, Raleigh, NC (US); Keith Kondrat, Exeter, NH (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/484,000

(22) Filed: Apr. 10, 2017

(65) Prior Publication Data

US 2018/0293157 A1 Oct. 11, 2018

(51) Int. Cl.
*G06F 11/36* (2006.01)

(52) U.S. Cl.
CPC ...... *G06F 11/3688* (2013.01); *G06F 11/3684* (2013.01)

(58) Field of Classification Search
None
See application file for complete search history.

(56) References Cited

U.S. PATENT DOCUMENTS

| 5,974,256 | A | 10/1999 | Matthews et al. | |
| 8,904,355 | B2* | 12/2014 | Channamsetti | G06F 11/3684 717/124 |
| 8,959,477 | B2* | 2/2015 | Mueller | G06F 9/44 717/106 |
| 9,152,542 | B2* | 10/2015 | Navalur | G06F 11/3684 |
| 9,442,828 | B2* | 9/2016 | Pilot | G06F 11/3684 |
| 2011/0072371 | A1* | 3/2011 | Segal | G06F 8/38 715/763 |
| 2012/0291011 | A1* | 11/2012 | Quine | G06F 9/45512 717/115 |

OTHER PUBLICATIONS

Dwarakanath, "Accelerating Test Automation through a Domain Specific Language", 2017, Published in: 2017 IEEE International Conference on Software Testing, Verification and Validation (Year: 2017).*

* cited by examiner

*Primary Examiner* — Hossain M Morshed
(74) *Attorney, Agent, or Firm* — Proskauer Rose LLP

(57) ABSTRACT

Methods and apparatuses are described for automated script creation and source code generation for testing mobile devices. A server computing device generates a test script user interface for creating test scripts. The test script user interface comprises a first section for displaying a first plurality of test steps, a second section for displaying one or more properties of a programmatic method, a third section for displaying source code of the programmatic method, and a fourth section for displaying a screen representation of a mobile device application under test. The server computing device generates the first plurality of test steps in an ordered sequence, and automatically generates source code of the programmatic method for each of the first plurality of test steps. The server computing device creates a test script using the automatically-generated source code and executes the test script against a mobile device application on a mobile device.

27 Claims, 13 Drawing Sheets

```
CommonPageiPhone : bcLaunchApp
NavMenuPageiPhone : bcTapAccounts
T: LoginiPhone
LoginPageiPhone : bcDismissPopUps
J: Double d1 =
J:    Double.parseDouble(Price.substring(1,
J:    Price.length())) + 2;
J: int r = (int) Math.round(d1*100);
J: d1 = r / 100.0;
J: FBPrice = Double.toString((d1));
```

FIG. 10

Method

Class: LoginPageiPhone

Method: bcLogin

ReturnType: boolean

Parameters: final ExecutionUnit execUnit, String vUserName, String vPassword

Description: Enters UserName, Password and Taps on Login Button

```
bcLogin
public void bcLogin(final ExecutionUnit execUnit, String vUserName, String vPa
{
    if(SeeTestBase.getInstance().checkElementPresent(execUnit, "CommonPage.b
    SeeTestBase.getInstance().tap(execUnit, "CommonPage.btnOKOfTouchID");
    }
    this.bcTypeUserName(execUnit, vUserName);
    this.bcTypePassword(execUnit, vPassword);
    this.bcUnCheckRmbrUserNameChkbox(execUnit);
    this.bcTapLogin(execUnit);
    this.bcTapOK(execUnit);
    SeeTestBase.getInstance().pause(execUnit, "5000");
    try
    {
            this.bcWaitforLoadingIcontoVanish(execUnit);
    }
    catch (Exception e)
    {
```

FIG. 12

AUTOMATED SCRIPT CREATION AND SOURCE CODE GENERATION FOR TESTING MOBILE DEVICES

TECHNICAL FIELD

This application relates generally to methods and apparatuses, including computer program products, for automated script creation and source code generation for testing mobile devices.

BACKGROUND

Today's mobile computing devices, such as tablets and smartphones, are available in a wide variety of hardware and software platforms each having different operational requirements and form factors. Most of these devices provide software to enable users to connect to the internet and access various browser-based and/or native applications. Today's applications typically require the same test cases to be performed across multiple platforms and layouts, where each application often has slight variations in terms of appearance and function when executed on each device due to elements like screen size, user interface design, hardware profile, and so forth. As a result, the ability for application developers to quickly and efficiently test such mobile applications across the spectrum of devices, platforms, and layouts—without much (if any) manual tester involvement—has become important.

In traditional testing frameworks, a group of test engineers (TEs) know the mobile application thoroughly and how to optimally test the application, and such engineers are increasingly responsible for writing automated test scripts. However, these engineers are typically not software programmers or developers that have experience writing software code in programming languages (e.g., Java, C++)—even though traditional software testing frameworks require such expertise. As a result, software engineers in test (SETs)—those have technical programming expertise to write test cases in a particular programming language—must be relied on to craft test cases for execution, e.g., by an automation engine against the various mobile device platforms. As a result, the test scripts generated by the SETs are generally not optimized for thoroughly testing the mobile application and such test scripts are not easily adaptable or modifiable for changing testing scenarios or requirements across multiple mobile device platforms.

SUMMARY

Therefore, methods and systems are needed for automated script creation and source code generation for testing mobile devices using a robust, streamlined set of tools to create and manage test suites and test cases without requiring advanced programming language knowledge or skills.

As can be appreciated, the system described herein leverages advantageous predictability logic embedded into the user interface tool, which provides the end user the ability to choose a programmatic method from an automatically-generated list of existing programmatic methods already available in the system. The list of programmatic methods available to use is displayed based on the previous programmatic method that was selected. Primarily, this technique ensures no code redundancy by providing the appropriate contextual information to the user at the required time frame. Also, the technique acts as a quick reference guide helping the user to choose the programmatic methods efficiently, and quickly, as they progress with their automated script creation (e.g., similar to an auto-complete feature).

Also, a significant technical advantage realized by the methods and systems described herein is the code redundancy elimination, which inherently saves computer processor execution cycles and memory usage.

The invention, in one aspect, features a computerized method of automated script creation and source code generation for testing mobile devices. A server computing device generates a test script user interface for creating one or more test scripts. The test script user interface comprises a first section for displaying a first plurality of test steps written in a first programming language, the first section including user input elements, wherein each of the first plurality of test steps corresponds to a programmatic method written in a second programming language; a second section for displaying one or more properties of the programmatic method written in the second programming language that corresponds to a selected one of the first plurality of test steps; a third section for displaying source code of the programmatic method written in the second programming language that corresponds to the selected one of the first plurality of test steps; and a fourth section for displaying a screen representation of a mobile device application under test. The server computing device generates the first plurality of test steps in an ordered sequence based upon activation of one or more of the user input elements. The server computing device automatically generates the source code of the programmatic method written in the second programming language for each of the first plurality of test steps upon generation of each of the first plurality of test steps. The server computing device creates a test script using the automatically-generated source code. The server computing device executes the test script against a mobile device application on a mobile device to test one or more functions of the mobile device application.

The invention, in another aspect, features a system for automated script creation and source code generation for testing mobile devices. The system includes a server computing device configured to generate a test script user interface for creating one or more test scripts. The test script user interface comprises a first section for displaying a first plurality of test steps written in a first programming language, the first section including user input elements, wherein each of the first plurality of test steps corresponds to a programmatic method written in a second programming language; a second section for displaying one or more properties of the programmatic method written in the second programming language that corresponds to a selected one of the first plurality of test steps; a third section for displaying source code of the programmatic method written in the second programming language that corresponds to the selected one of the first plurality of test steps; and a fourth section for displaying a screen representation of a mobile device application under test. The server computing device is configured to generate the first plurality of test steps in an ordered sequence based upon activation of one or more of the user input elements. The server computing device is configured to automatically generate the source code of the programmatic method written in the second programming language for each of the first plurality of test steps upon generation of each of the first plurality of test steps. The server computing device is configured to create a test script using the automatically-generated source code. The server computing device is configured to execute the test script against a mobile device application on a mobile device to test one or more functions of the mobile device application.

The invention, in another aspect, features a computer program product tangibly embodied in a non-transitory computer readable storage device, for automated script creation and source code generation for testing mobile devices. The computer program product includes instructions operable to cause a server computing device to generate a test script user interface for creating one or more test scripts. The test script user interface comprises a first section for displaying a first plurality of test steps written in a first programming language, the first section including user input elements, wherein each of the first plurality of test steps corresponds to a programmatic method written in a second programming language; a second section for displaying one or more properties of the programmatic method written in the second programming language that corresponds to a selected one of the first plurality of test steps; a third section for displaying source code of the programmatic method written in the second programming language that corresponds to the selected one of the first plurality of test steps; and a fourth section for displaying a screen representation of a mobile device application under test. The computer program product includes instructions operable to cause the server computing device to generate the first plurality of test steps in an ordered sequence based upon activation of one or more of the user input elements. The computer program product includes instructions operable to cause the server computing device to automatically generate the source code of the programmatic method written in the second programming language for each of the first plurality of test steps upon generation of each of the first plurality of test steps. The computer program product includes instructions operable to cause the server computing device to create a test script using the automatically-generated source code. The computer program product includes instructions operable to cause the server computing device to execute the test script against a mobile device application on a mobile device to test one or more functions of the mobile device application.

Any of the above aspects can include one or more of the following features. In some embodiments, generating the first plurality of test steps comprises identifying, by the server computing device, one or more candidate test steps to follow a selected one of the first plurality of test steps; and displaying, by the server computing device, the one or more candidate test steps in the test script user interface. In some embodiments, the one or more candidate test steps are identified based upon a compatibility with one or more characteristics of the selected one of the first plurality of test steps. In some embodiments, the server computing device updates the identification of the one or more candidate test steps based upon a change to the selected one of the first plurality of test steps.

In some embodiments, generating the first plurality of test steps comprises receiving, by the server computing device, an activation event corresponding to one of the user interface elements; generating, by the server computing device, a test step written in the first programming language based upon the activation event; and inserting, by the server computing device, the generated test step into the first plurality of test steps. In some embodiments, at least one of the first plurality of test steps comprises a template including a predefined sequence of test steps with an entry attribute and an exit attribute. In some embodiments, the entry attribute relates to a test step that precedes the template in the ordered sequence of the first plurality of test steps. In some embodiments, the exit attribute relates to a test step that follows the template in the ordered sequence of the first plurality of test steps.

In some embodiments, the one or more user input elements include a method browser button, a variable declaration button, an assignment button, a control flow button, a template insertion button, and a source code insertion button. In some embodiments, the first programming language is a line-oriented scripting language. In some embodiments, the second programming language is Java.

In some embodiments, automatically generating the source code comprises translating, by the server computing device, the first plurality of test steps written in the first programming language into source code of the corresponding programmatic methods written in the second programming language. In some embodiments, creating a test script using the automatically-generated source code comprises aggregating, by the server computing device, the automatically-generated source code into a test script file; and storing, by the server computing device, the test script file in a database. In some embodiments, executing the test script against a mobile device application comprises transmitting, by the server computing device, the test script to an automation engine computing device coupled to the server computing device and coupled to one or more mobile devices; and executing, by the automation engine, the test script to control operation of the mobile device application on the mobile device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 10 is an exemplary test script with inserted source code written in Java.

FIG. 11 a diagram of an exemplary test script user interface section for displaying properties of a programmatic method written in a second programming language.

FIG. 12 is a diagram of an exemplary test script user interface section for displaying source code of the programmatic method written in the second programming language.

DETAILED DESCRIPTION

Figure 1:
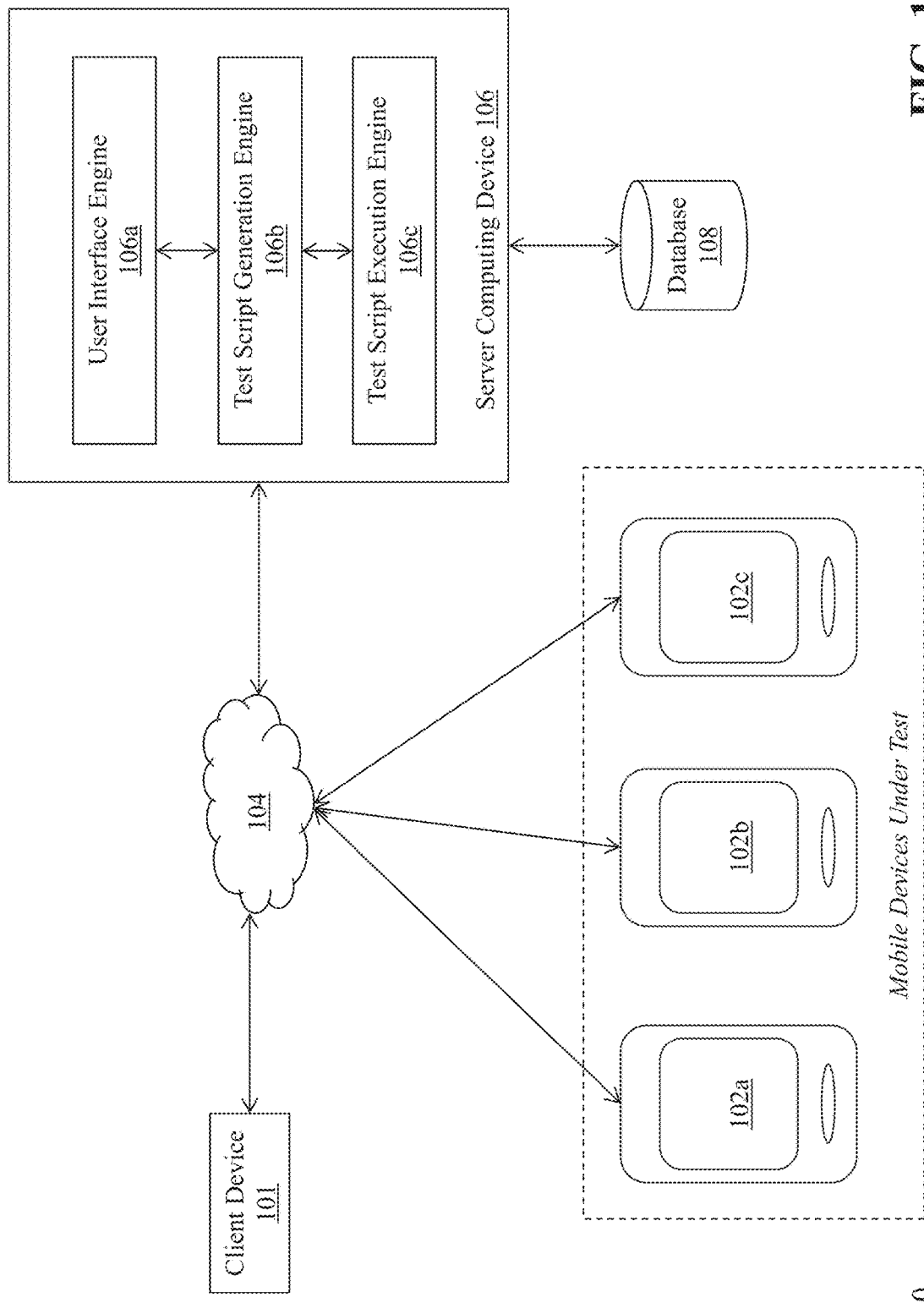
FIG. 1 is a block diagram of a system for automated script creation and source code generation for testing mobile devices.

FIG. 1 is a block diagram of a system 100 for automated script creation and source code generation for testing mobile devices. The system 100 includes a client computing device 101, a plurality of mobile computing devices under test 102a-102c, a communications network 104, a server computing device 106 with a user interface engine 106a, a test script generation engine 106b, and a test script execution engine 106c, and a database 108.

The client computing device 101 uses software and circuitry (e.g., processor, memory) to execute applications and to communicate with the server computing device 106 via the communication network 104 (e.g., using browser software installed on the device to connect to the Internet via an embedded Wi-Fi antenna) for the automated script creation and source code generation for testing mobile devices 102a-102c as described herein. Example client computing devices 101 can include, but are not limited to, a desktop computer, laptop computer, tablet, mobile device or other similar types of computing devices.

The mobile computing devices 102a-102c use software and circuitry (e.g., processor, memory) to execute applications and to communicate with the server computing device 106 via the communication network 104 (e.g., using browser software installed on the device to connect to the Internet via an embedded Wi-Fi antenna) for the purposes of testing mobile applications installed on the devices as described herein. Example mobile computing devices 102a-102c can include, but are not limited to, a smart phone (e.g., Apple iPhone®, Windows®, and/or Android™-based device) or other similar mobile communications devices.

The communication network 104 enables components of the system 100 to communicate with each other using a packet-based protocol (e.g., IP). The network 104 may be a local network, such as a LAN, or a wide area network, such as the Internet. In some embodiments, the network 104 is comprised of several discrete networks and/or sub-networks (including related routing, load balancing, and traffic metering hardware).

The server computing device 106 is a combination of hardware and software modules that includes specialized hardware and/or software modules that execute on a processor and interact with memory modules of the server computing device 106, to receive data from the database 108 to transmit data to the database 108, and to communicate with the other devices of the system 100 (e.g., client device 101, mobile devices 102a-102c) in order to perform functions for automated script creation and source code generation for testing mobile devices as described herein. The server computing device 106 includes user interface engine 106a, a test script generation engine 106b, and a test script execution engine 106c (as mentioned above) that execute on and/or interact with the processor of the server computing device 106.

In some embodiments, the user interface engine 106a, the test script generation engine 106b, and the test script execution engine 106c are specialized sets of computer software instructions programmed onto one or more dedicated processors in the server computing device 106 and can include specifically-designated memory locations and/or registers for executing the specialized computer software instructions. Although the user interface engine 106a, the test script generation engine 106b, and the test script execution engine 106c are shown in FIG. 1 as executing within the same server computing device 106, in some embodiments the functionality of the user interface engine 106a, the test script generation engine 106b, and the test script execution engine 106c can be distributed among a plurality of server computing devices. As shown in FIG. 1, the server computing device 106 enables the user interface engine 106a, the test script generation engine 106b, and the test script execution engine 106c to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the user interface engine 106a, the test script generation engine 106b, and the test script execution engine 106c is described in detail below.

The user interface engine 106a communicates with the client computing device 101 in order to generate a user interface for automated script creation and source code generation for testing mobile devices as described herein. As will be described in greater detail below, the user interface engine 106a generates a user interface that is displayed on the client computing device 101 and receives actions (e.g., input of user-defined text, interaction with user interface elements, and the like) performed on the client computing device 101 that are transmitted back to the server computing device 106 for creating test scripts and corresponding source code for testing the mobile devices.

The test script generation engine 106b receives actions (e.g., input of user-defined text, interaction with user interface elements, and the like) performed on the client computing device 101 to generate test scripts in a first programming language and to automatically generate source code in a second programming language from the test scripts, for the purposes of executing the source code against an application on the mobile devices 102a-102c for testing the application, as will be described in greater detail below.

The database 108 is a computing device (or in some embodiments, a set of computing devices) coupled to the server computing device 106 and is configured to receive, generate, and store specific segments of data relating to the process of automatic validation of applications on synchronized mobile devices as described herein. In some embodiments, all or a portion of the database 108 can be integrated with the server computing device 106 or be located on a separate computing device or devices. The database 108 can comprise one or more databases configured to store portions of data used by the other components of the system 108, as will be described in greater detail below. An exemplary database 108 is MySQL™ available from Oracle Corp. of Redwood City, Calif.

Figure 2:
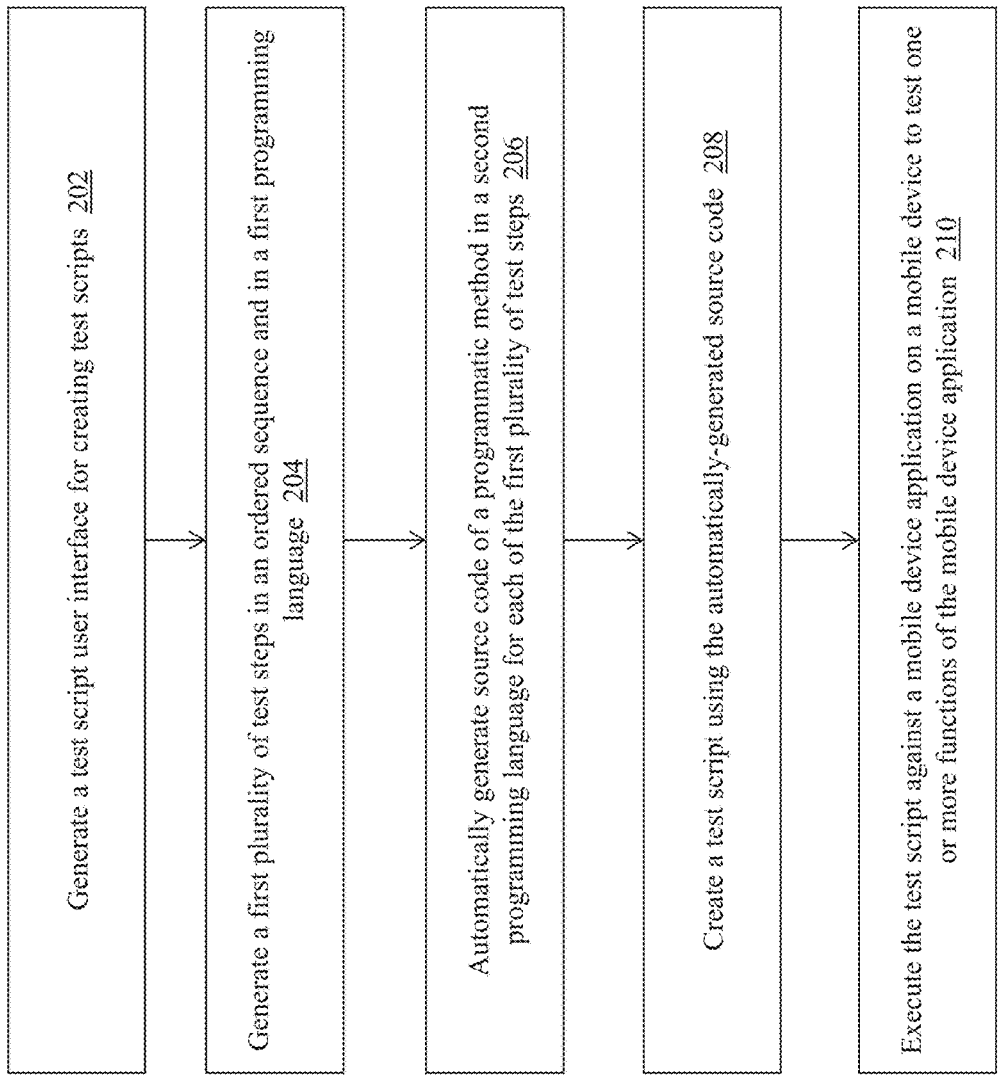
FIG. 2 is a flow diagram of a method of automated script creation and source code generation for testing mobile devices.

FIG. 2 is a flow diagram of a method 200 of automated script creation and source code generation for testing mobile devices, using the system 100 of FIG. 1. A user at client device 101 connects to the server computing device 106 via communications network 104 in order to create and execute test scripts as described herein. The user interface engine 106a generates (202) a test script user interface for creating one or more test scripts and transmits information to the client device 101 for display of the test script user interface (e.g., via a display device such as a monitor or screen coupled to the client device).

Figure 3:
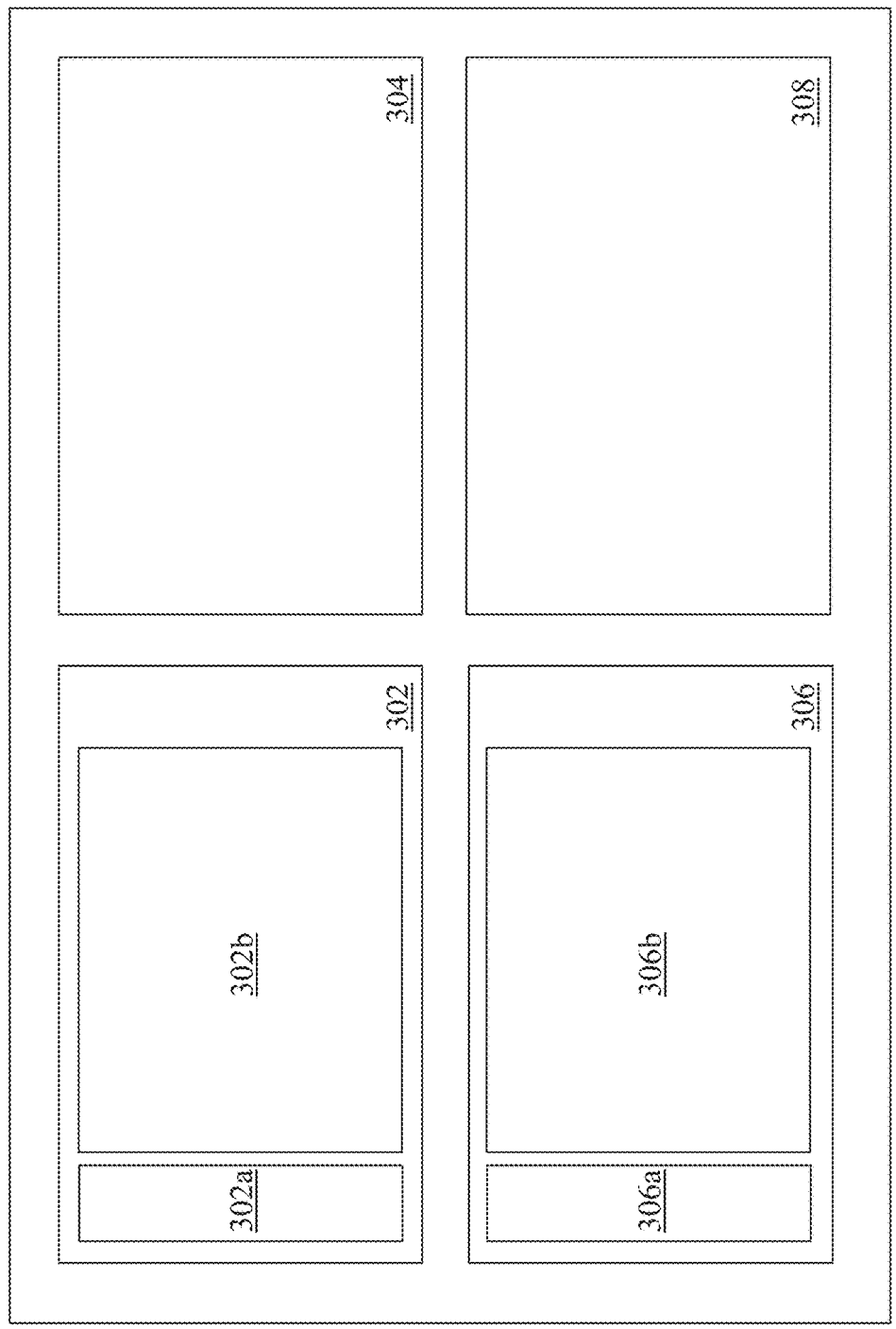
FIG. 3 is a layout diagram of an exemplary test script user interface for creating test scripts.

FIG. 3 is a layout diagram of an exemplary test script user interface 300 for creating test scripts that is generated by the user interface engine 106*a* of system 100. As shown in FIG. 3, the test script user interface comprises a plurality of different sections 302, 304, 306, 308 that will be described herein with respect to FIGS. 4-13. Section 302 includes subsections 302*a*, 302*b* and section 306 includes subsections 306*a* and 306*b*. It should be appreciated that the layout presented in FIG. 3 is exemplary, and that other layouts or configurations of the test script user interface can be contemplated without departing from the scope of invention.

Figure 4:
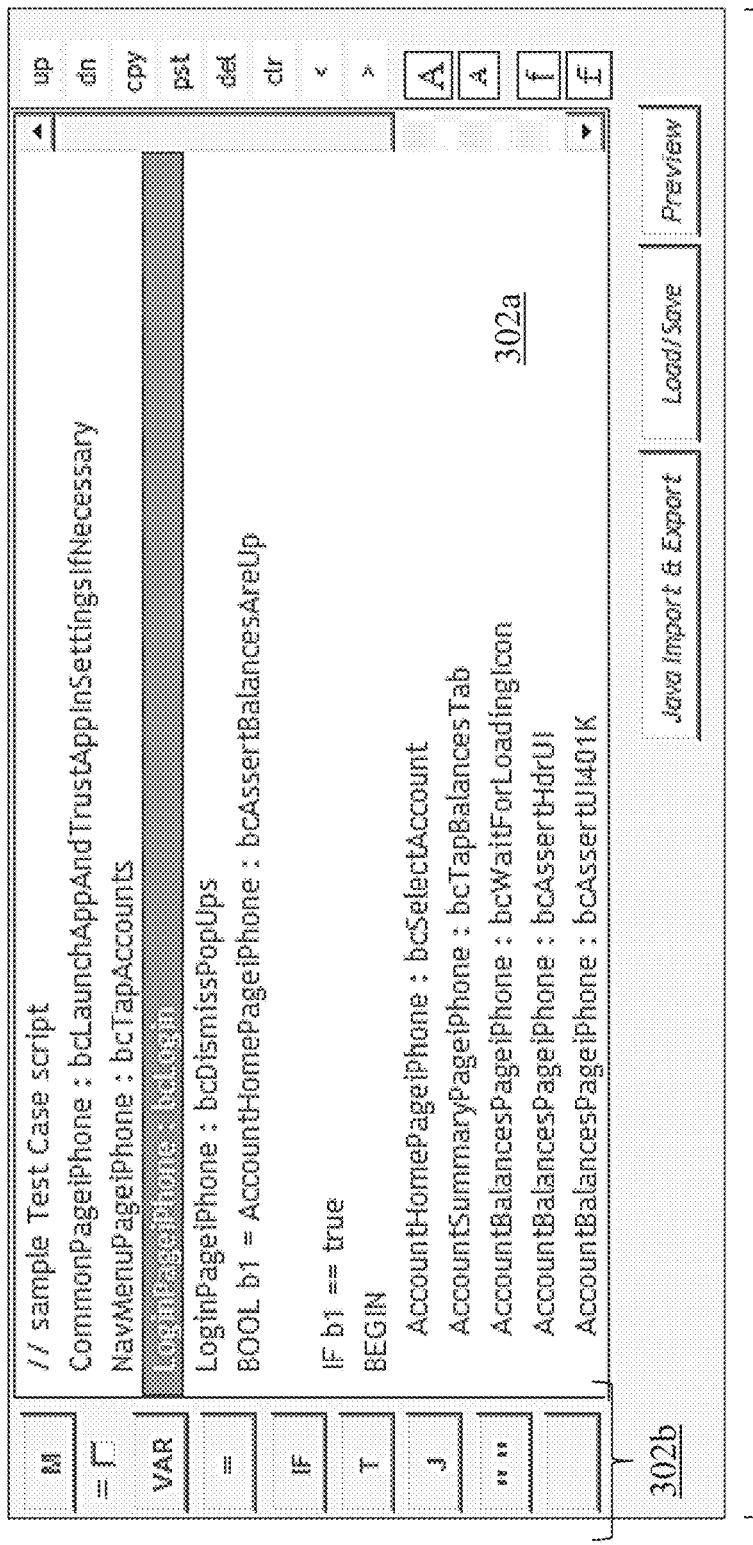
FIG. 4 is a diagram of an exemplary test script user interface section for entering and displaying test steps written in a first programming language.
Figure 5:
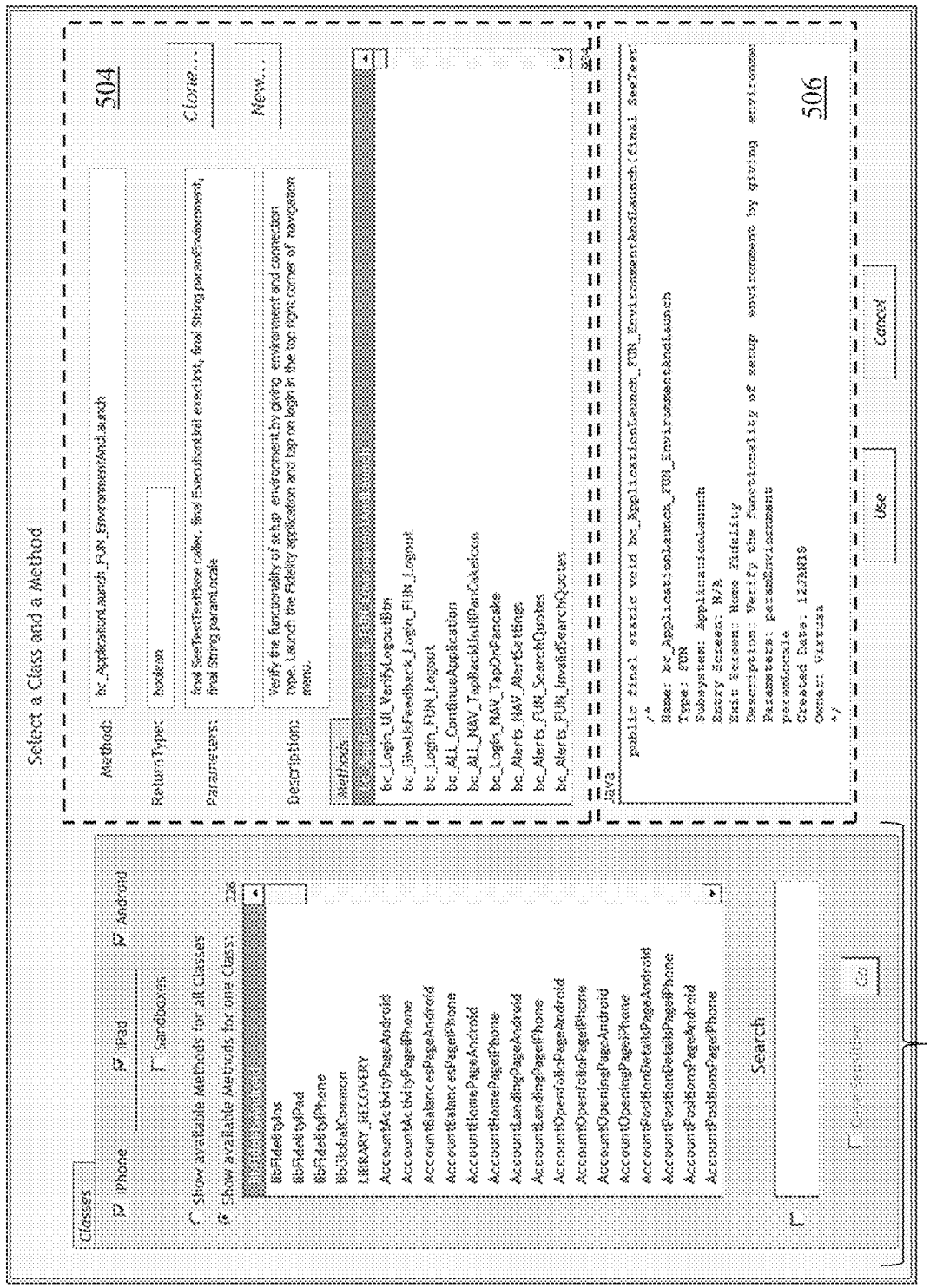
FIG. 5 is a diagram of an exemplary user interface window to select a programmatic class and method to be inserted into the test script.
Figure 6:
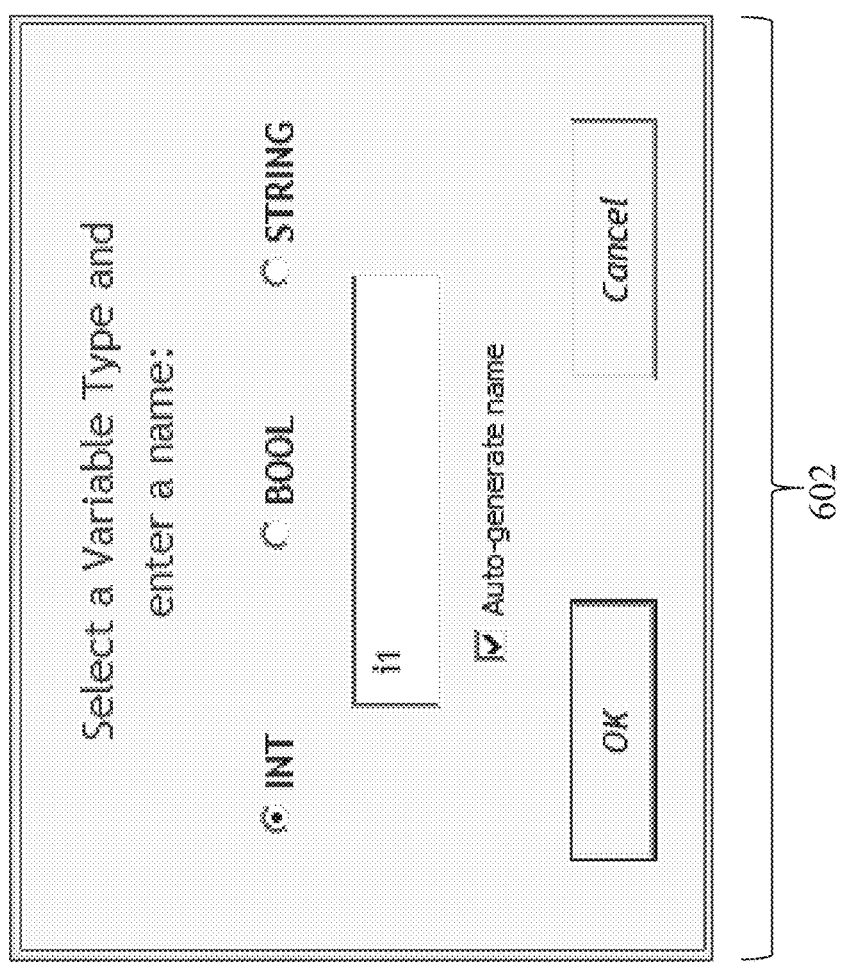
FIG. 6 is a diagram of an exemplary user interface window to define a variable to be inserted into the test script.
Figure 7:
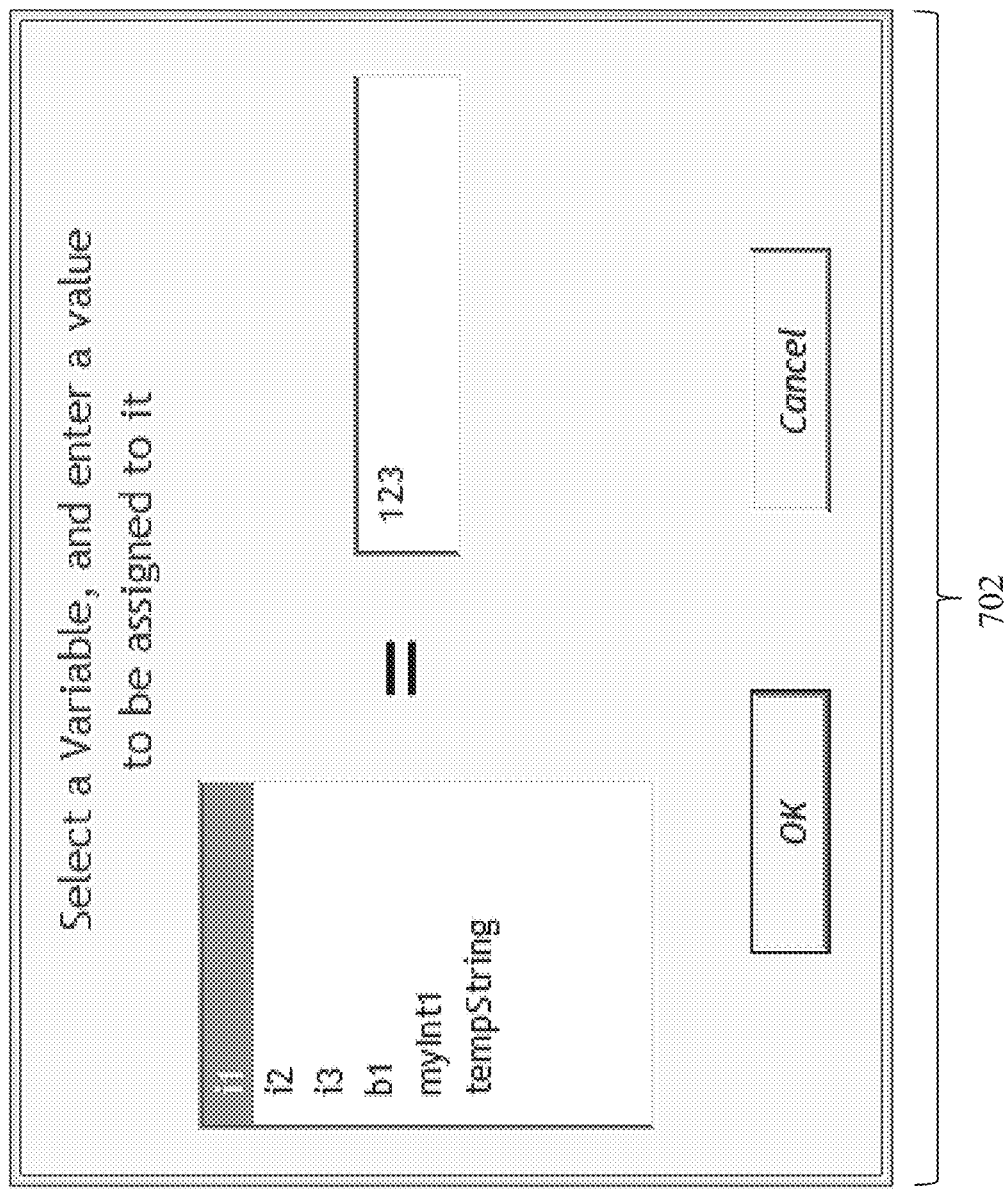
FIG. 7 is a diagram of an exemplary user interface window to assign a value to a defined variable for insertion into the test script.
Figure 8:
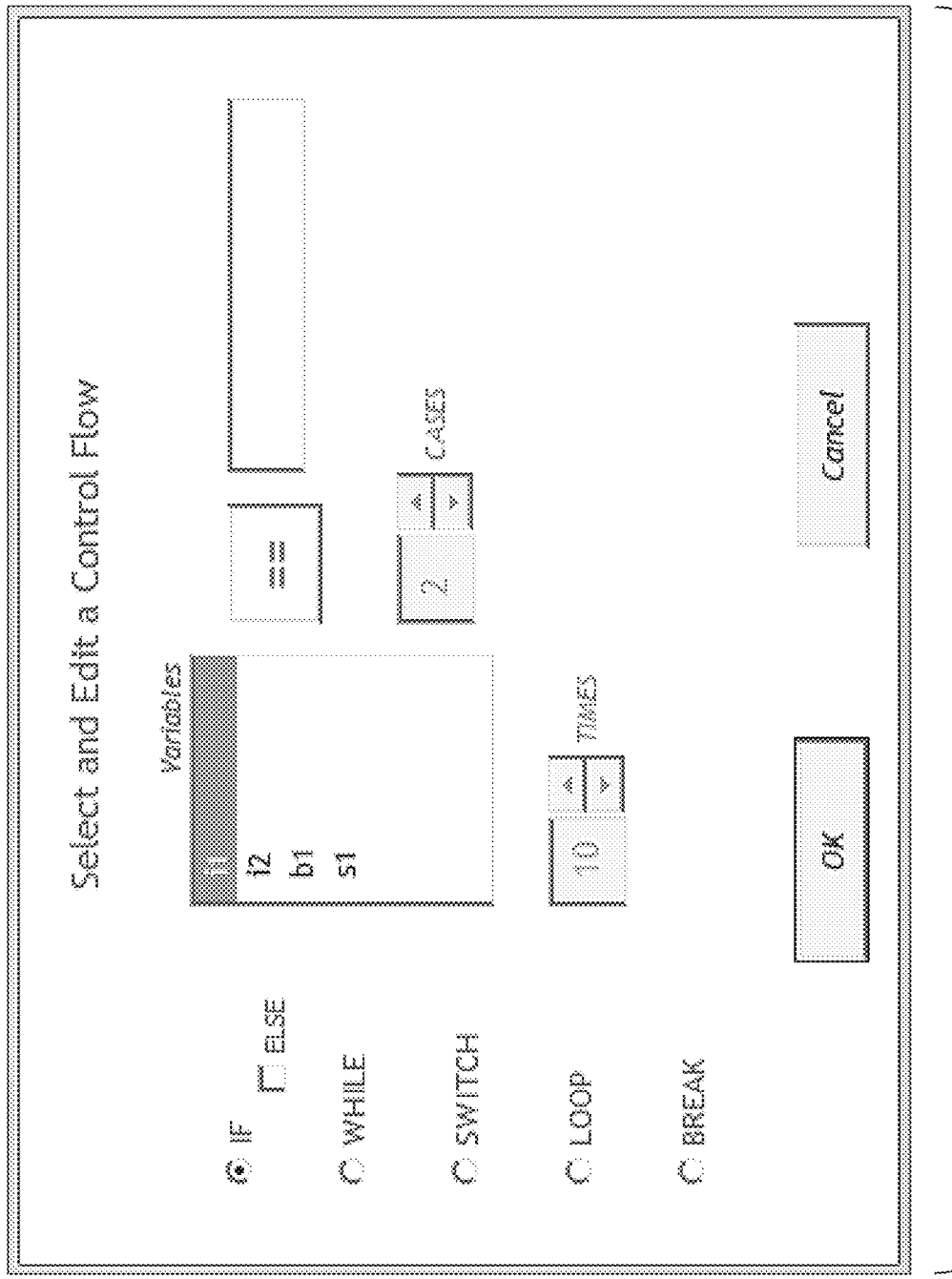
FIG. 8 is a diagram of an exemplary user interface window to create a logic control flow for insertion into the test script.
Figure 9:
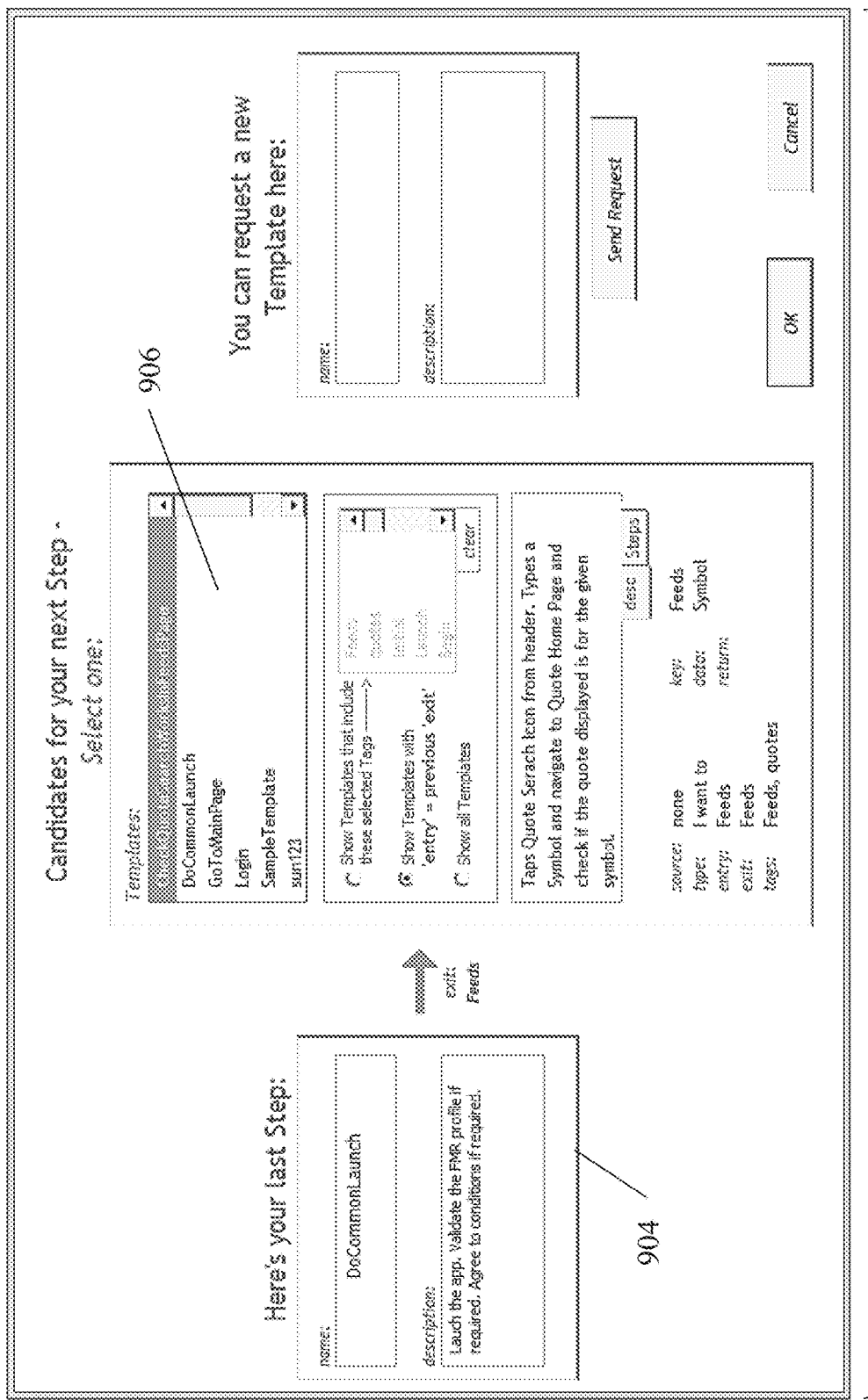
FIG. 9 is a diagram of an exemplary user interface window to select one or more templates for insertion into the test script.

FIG. 4 is a diagram of an exemplary test script user interface section (i.e., Section 302 of FIG. 3) for entering and displaying test steps written in a first programming language (e.g., a scripting language). As shown in FIG. 4, section 302 comprises subsections 302*a* and 302*b*. Subsection 302*a* comprises a window for displaying a plurality of test steps in an ordered sequence of commands and instructions that make up a test script. Each line of code in section 302 corresponds to a test step, and each test step is generated via activation of the user input elements, including the command buttons contained in section 302*b*. For example, each of the buttons in section 302*b* corresponds to a particular command, operator, syntax element or other type of construct in the first programming language. Each of the control buttons in section 302*b* is discussed in turn below.

The "M" button, when activated, enables the selection of a class:method (e.g., "LoginPageiPhone:bcLogin") for insertion as a test step into the test script. In one embodiment, activation of the "M" button launches a user interface window (shown in FIG. 5) generated by the user interface engine 106*a* in which the user can select a programmatic class and method to be inserted into the test script. The user interface window of FIG. 5 includes a section 502 that lists available classes and provides an option for the user to view available methods for all classes and/or available methods for one class. The section 502 also includes a freeform text search input field for looking up specific classes and/or methods. The user interface window of FIG. 5 includes a section 504 that displays a list of the methods that are included in the selected class, as well as attributes of the currently selected method (e.g., name, return type, parameters, description). The user interface window of FIG. 5 further includes a section 506 that displays source code written in a programming language (e.g., Java) that is different from the test script language. The server computing device 106 translates the selected class:method into corresponding source code and the user interface window includes the translated source code for user reference.

The "VAR" button, when activated, enables the definition of a variable (e.g., select a variable type and generate a variable name) for insertion into the test script. In one embodiment, activation of the "VAR" button launches a user interface window (window 602 shown in FIG. 6) generated by the user interface engine 106*a* in which the user can select a variable type (e.g., INT, BOOL, STRING) and input and/or automatically generate a variable name (e.g., "i1").

The "=" button, when activated, enables the assignment of a value to a defined variable for insertion into the test script. In one embodiment, activation of the "=" button launches a user interface window (window 702 in FIG. 7) generated by the user interface engine 106*a* in which the user can select a variable (e.g., from a list of predefined variables, including those that the user defined via the "VAR" button) and input a corresponding value for the variable (e.g., "123").

The "IF" button, when activated, enables the creation of a logic control flow for insertion into the test script. A logic control flow, for example, can include one or more IF-THEN statements, BEGIN-END statements, WHILE statements, SWITCH statements, CASE statements, LOOP commands, BREAK commands, and the like for an automatically-sequenced logic flow for the test steps. In one embodiment, activation of the "IF" button launches a user interface window (window 802 shown in FIG. 8) generated by the user interface engine 106*a* in which the user can select logical operators (including those noted above), and select one or more variables to be compared with a value, e.g. for the system to evaluate in determining whether to start, continue, end the logic control flow.

The "T" button, when activated, enables the selection of one or more templates (i.e., short, pre-authored test scripts that typically consolidate sequences of commonly-used methods) for insertion into the test script. In one embodiment, activation of the "T" button launches a user interface window (window 902 shown in FIG. 9) generated by the user interface engine 106*a* in which the user can select one or more templates. The user interface window 902 displays the previous step 904 in the test script and displays a list of templates 906 that can be inserted after the previous step, along with related details of the selected template. In some embodiments, the system 100 automatically generates the list of templates 906 as candidates based upon one or more compatibilities with the previous step 904. For example, each template is defined to include entry and exit attributes, which are pre-defined steps that lead into the template (in the case of the entry attribute) and lead out of the template (in the case of the exit attribute). Therefore, based upon a specific point in the test script at which the user desires to insert a template, the system understands the previous step and the next step around the specific point and can thus retrieve one or more templates whose entry attribute and exit attribute match the previous step and the next step, respectively, for display and selection by the user. In this way, the system provides automated, guided scripting for the user—which lowers the learning curve for test engineers and QA professionals, and also reduces scripting time.

The "J" button, when activated, enables the insertion of source code written in a different programming language (e.g., Java) from the rest of the test script. In one embodiment, activation of the "J" button enables the user to write custom source code and the system automatically inserts the source code into the test script (and with a specific syntax to denote the test steps specifically as source code). FIG. 10 is an exemplary test script with inserted source code written in Java. As shown in FIG. 10, the source code insertions include the character string "J:" at the beginning of each line in the script to denote to the system that Java source code has been inserted on that line, so that the system parses the line accordingly.

As mentioned previously, the user at client device 101 interacts with the user interface elements of FIGS. 3-10 as described above, and the test script is automatically generated in a first programming language (e.g., a scripting language) and displayed in section 302. As such, the user interface engine 106*a* of server computing device 106 provides an advantageous point-and-click user interface for a test engineer to seamlessly and efficiently generate a test script in a scripting language without requiring the user to write the test script in a certain programming language (e.g., Java) that may be required by the test script execution engine 106c to run the test script against software applications on the mobile devices 102a-102c.

Turning back to FIG. 3, the user interface 300 includes several other sections 304, 306, 308 that are described in turn below.

FIG. 11 is a diagram of an exemplary test script user interface section 304 for displaying properties of a programmatic method written in a second programming language. A user can select a test step in the test script section 302 and the user interface engine 106a displays in section 304 the specific properties of the programmatic method corresponding to the selected test step. For example, as shown in FIG. 4, the step "LoginPageiPhone:bcLogin" is highlighted—meaning it has been selected. Accordingly, as shown in FIG. 11, the user interface engine 106a displays specific attributes of the class:method associated with the selected test step—Class, Method, ReturnType, Parameters, and Description. Display of this information enables the user to quickly understand the programmatic features of the selected class:method in the second programming language (e.g., Java).

FIG. 12 is a diagram of an exemplary test script user interface section 306 for displaying source code of the programmatic method written in the second programming language that corresponds to the test step selected in section 302. As shown in FIG. 12, section 306 comprises subsections 306a and 306b. Subsection 306a comprises a window for displaying source code of the programmatic method that corresponds to the selected test step from the test script displayed in section 302 of the user interface. For example, the method "bcLogin" is selected in the test script of FIG. 4. Therefore, the source code displayed in subsection 306a is the, e.g., Java code that comprises the bcLogin method. The user interface engine 106a retrieves the Java code associated with the selected test step and displays it in subsection 306a.

Subsection 306b comprises control buttons for the user to interact with when editing the source code. The following describes exemplary functionality that the control buttons 306b provide:

Action Button 'A': When activated, enables insertion of method that can interact with a physical device.

Action Button "VAR": When activated enables the insertion of variable in the context of a method. This button gives an option to add a Integer, String or Boolean variable.

Action Button '=': When the ',' button is activated, it adds an assignment step in the context of the selected method. Any of the variables added using the 'V' button can be assigned a value through this button.

Action button '=': This button when enabled, allows a variable to be associated with methods. Any of the variables added using the 'V' button can be assigned to the method.

Action button 'IF': This button adds a control flow block.

Action button 'J': Allows insertion of custom Java Code.

Action button " "": Allows insertion of comments.

Action button Blank: Allows insertion of a blank line.

Figure 13:
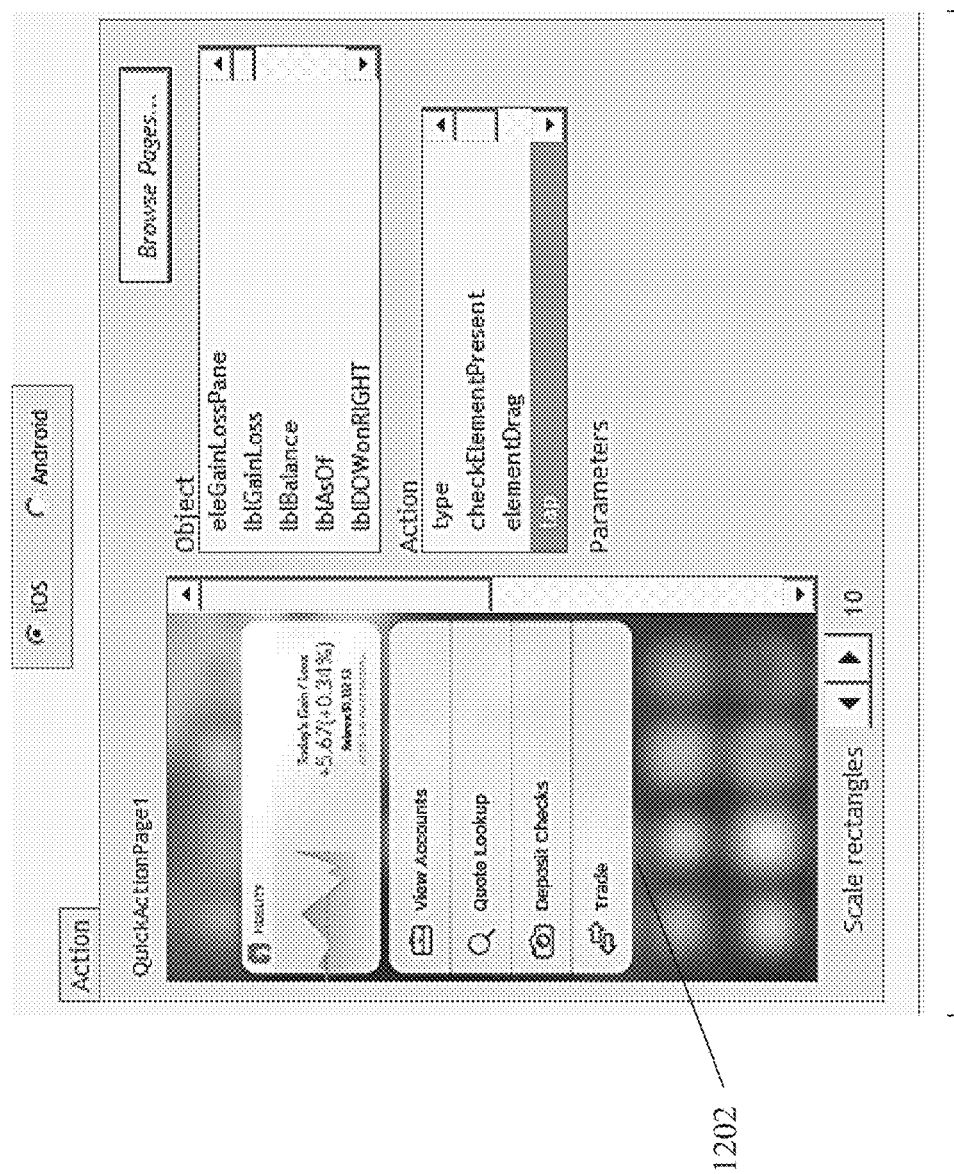
FIG. 13 is a diagram of an exemplary test script user interface section for displaying a screen representation of a mobile device application under test.

FIG. 13 is a diagram of an exemplary test script user interface section 308 for displaying a screen representation of a mobile device application under test. As shown in FIG. 13, the section 308 includes a visual representation 1202 (i.e., a static image) of the mobile device application as it would be displayed, e.g., on mobile devices 102a-102c during test. The section 308 also includes several user input elements 1204 that enable selection of specific actions to be performed in the mobile device application (e.g., tap, drag, check for UI elements) during the testing phase. The user interface engine 106a can insert these selected actions into the test script automatically without requiring the user to write specific source code or scripting commands.

As shown in FIG. 13, the section 308 contains a static image 1202 of a selected mobile screen. The UI objects available on the page are highlighted on the static image based on the information available on file. The user interface section 308 is introduced to align with the WYSIWYG (What You See Is What You Get) principle—the section 308 acts as a WYSISYG Editor enabling users to program/code on the UI elements directly. The section 308 has the following areas:

1. Preview Screen—Static Image 1202 of the selected page.
2. Browse button which allows the user to select a particular screen.
3 Object Area—Displays all the objects available on the selected screen.
4. Action Area—Possible actions that can be performed on the objects of that selected screen.

Turning back to FIG. 2, the user interface engine 106a generates (204) a plurality of test steps in an ordered sequence based upon activation of one or more of the user input elements. As described above, the user at client device 101 interacts with the user interface 300 and corresponding user interface elements to generate the test script (e.g., via point-and-click operations) in a scripting language.

Once the test script is generated, the test script generation engine 106b receives the test script and compiles the test script to automatically generate (206) source code in a second programming language (e.g., Java) that corresponds to the test script as written in the scripting language. For example, each test step in the test script, as written in the first programming language, corresponds to at least one programmatic method written in the second programming language. The test script generation engine 106b parses the test script and for each test step, retrieves and/or generates the Java code that corresponds to the programmatic method for that test step, then aggregates the Java code together. The test script generation engine 106b creates (208) a new test script written in Java—advantageously without the need for any knowledge or programming experience in Java from the test engineer who built the test script using the scripting language.

In one embodiment, the test script generation engine 106b parses the test script data in the first programming language line by line and generates output. The test script generation engine 106b converts these test steps into programmatic methods in the second programming language using the data available in one or more specialized text mapping files for the engine 106b. For example, these specialized text mapping files have references to the programmatic methods in the second programming language that correspond to the particular test step in the first programming language.

Each time a programmatic method for the second programming language is brought into the system (e.g., when choosing a particular programmatic method in the method editor interface), a corresponding text mapping file gets created. Also, any time the method is edited through the user interface, both the text mapping file and the corresponding code in the second programming language is updated. Thus, translation between the two programming languages is performed by the engine 106b using data available in two layers—the specialized text mapping files that have the test step definition and the files in the second programming language (e.g., .class java files) that have the programmatic code.

The test script generation engine 106b passes the created Java test script to the test script execution engine 106c, and the engine 106c executes (210) the Java test script against a mobile device application on one or more mobile devices 102a-102c to test one or more functions of the mobile device application. In one embodiment, the test script execution engine 106c can be coupled to a mobile device test management module or harness (not shown) that coordinates and synchronizes the test execution against the various mobile devices. It should be appreciated that the mobile computing devices 102a-102c can be devices of various types (i.e., have different hardware platforms, operating systems, form factors, and so forth) that are connected to the test script execution engine 106c for the purposes of testing the mobile application on each of the different devices 102a-102c. For example, one mobile device 102a might be an Apple® iPhone™ 5, another mobile device 102b might be an Apple® iPhone™ 6s, and a third mobile device 102c might be a Samsung Galaxy Note5™. It should be appreciated that the system 100 can be configured with any number of mobile devices of varying hardware, software, and form factor.

Also, it should be appreciated that in some embodiments the programmatic code in the second programming language that is generated by the system as described herein, is a java method with Test NG Annotation. Once the test script is generated, the script can be executed using a Test NG framework. The current framework abstracts the layer that talks to the mobile device. Currently, the layer is built upon SeeTest Library. However, the layer can be built for other toolsets, including, e.g., Appium, thus making the system completely tool agnostic.

In addition, in some embodiments the system includes a page creator module at the server computing device 106 which is a utility that provides the functions of an object editor—it does a basic syntax check on xpath expressions, and allows for import/export of xpath elements within the system.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of automated script creation and source code generation for testing mobile devices, the method comprising:

generating, by a server computing device, a test script user interface for creating one or more test scripts, wherein the test script user interface comprises:

a first section for displaying a first plurality of test steps written in a first programming language, the first section including user input elements, wherein each of the first plurality of test steps corresponds to a programmatic method written in a second programming language;

a second section for displaying one or more properties of the programmatic method written in the second programming language that corresponds to a selected one of the first plurality of test steps;

a third section for displaying source code of the programmatic method written in the second programming language that corresponds to the selected one of the first plurality of test steps, the third section including user elements for editing the source code of the programmatic method; and a fourth section for displaying a screen representation of a mobile device application under test;

generating, by the server computing device, the first plurality of test steps in an ordered sequence based upon activation of one or more of the user input elements;

receiving one or more text mapping files wherein the one or more text mapping files have references to the source code of a programmatic method in the second programming language that correspond to each of the first plurality of test steps;

creating an additional text mapping file corresponding to a programmatic method in the second language each time the programmatic method in the second language in brought into the system by choosing in a method editor interface;

automatically generating, by the server computing device, the source code of the programmatic method written in the second programming language for each of the first plurality of test steps upon generation of each of the first plurality of test steps, wherein the server computing device, for each test step:

parses the test step;

determines a text mapping file of the one or more text mapping files corresponding to the test step, wherein the text mapping file comprises a reference to the programmatic method written in the second programming language and the source code of the programmatic method written in the second programming language; and generates a copy of the source code of the programmatic method written in the second programming language using the text mapping file;

creating, by the server computing device, a test script using the automatically-generated source code; and executing, by the server computing device, the test script against a plurality of mobile device applications on a plurality of mobile devices to test one or more functions of the mobile device applications.

2. The method of claim 1, wherein the step of generating the first plurality of test steps comprises:

identifying, by the server computing device, one or more candidate test steps to follow a selected one of the first plurality of test steps; and displaying, by the server computing device, the one or more candidate test steps in the test script user interface.

3. The method of claim 2, wherein the one or more candidate test steps are identified based upon a compatibility with one or more characteristics of the selected one of the first plurality of test steps.

4. The method of claim 2, further comprising updating, by the server computing device, the identification of the one or more candidate test steps based upon a change to the selected one of the first plurality of test steps.

5. The method of claim 1, wherein a step of generating the first plurality of test steps comprises:

receiving, by the server computing device, an activation event corresponding to one of a user interface elements;

generating, by the server computing device, a test step written in the first programming language based upon the activation event; and inserting, by the server computing device, the generated test step into the first plurality of test steps.

6. The method of claim 1, wherein at least one of the first plurality of test steps comprises a template including a predefined sequence of test steps with an entry attribute and an exit attribute.

7. The method of claim 6, wherein the entry attribute relates to a test step that precedes the template in the ordered sequence of the first plurality of test steps.

8. The method of claim 6, wherein the exit attribute relates to a test step that follows the template in the ordered sequence of the first plurality of test steps.

9. The method of claim 1, wherein the one or more user input elements include a method browser button, a variable declaration button, an assignment button, a control flow button, a template insertion button, and a source code insertion button.

10. The method of claim 1, wherein the first programming language is a line-oriented scripting language.

11. The method of claim 1, wherein the second programming language is Java.

12. The method of claim 1, wherein the step of creating a test script using the automatically-generated source code comprises:

aggregating, by the server computing device, the automatically-generated source code into a test script file; and storing, by the server computing device, the test script file in a database.

13. The method of claim 1, wherein a step of executing the test script against a plurality of mobile device applications comprises:

transmitting, by the server computing device, the test script to an automation engine computing device coupled to the server computing device and coupled to the plurality of mobile devices; and executing, by the automation engine, the test script to control operation of the plurality of mobile device applications on the plurality of mobile devices, wherein execution of the test script at each of the plurality of mobile devices is synchronized.

14. A system for automated script creation and source code generation for testing mobile devices, the system comprising a server computing device having a memory for storing computer-executable instructions and a processor that executes the computer-executable instructions to:

generate a test script user interface for creating one or more test scripts, wherein the test script user interface comprises;

a first section for displaying a first plurality of test steps written in a first programming language, the first section including user input elements, wherein each of the first plurality of test steps corresponds to a programmatic method written in a second programming language;

a second section for displaying one or more properties of the programmatic method written in the second programming language that corresponds to a selected one of the first plurality of test steps;

a third section for displaying source code of the programmatic method written in the second programming language that corresponds to the selected one of the first plurality of test steps, the third section including user elements for editing the source code of the programmatic method; and a fourth section for displaying a screen representation of a mobile device application under test;

generate the first plurality of test steps in an ordered sequence based upon activation of one or more of the user input elements;

receive one or more text mapping files wherein the one or more text mapping files have references to the source code of a programmatic method in the second programming language that correspond to each of the first plurality of test steps;

create an additional text mapping file corresponding to a programmatic method in the second language each time the programmatic method in the second language in brought into the system by choosing in a method editor interface;

automatically generate the source code of the programmatic method written in the second programming language for each of the first plurality of test steps upon generation of each of the first plurality of test steps, wherein the server computing device, for each test step:

parses the test step;

determines a text mapping file of the one or more text mapping files corresponding to the test step, wherein the text mapping file comprises a reference to the programmatic method written in the second programming language and the source code of the programmatic method written in the second programming language; and generates a copy of the source code of the programmatic method written in the second programming language using the text mapping file;

create a test script using the automatically-generated source code; and execute the test script against a plurality of mobile device applications on a plurality of mobile devices to test one or more functions of the mobile device applications.

15. The system of claim 14, wherein generating the first plurality of test steps comprises:

identifying, by the server computing device, one or more candidate test steps to follow a selected one of the first plurality of test steps; and displaying, by the server computing device, the one or more candidate test steps in the test script user interface.

16. The system of claim 15, wherein the one or more candidate test steps are identified based upon a compatibility with one or more characteristics of the selected one of the first plurality of test steps.

17. The system of claim 16, wherein generating the first plurality of test steps comprises:

receiving, by the server computing device, an activation event corresponding to one of a user interface elements;

generating, by the server computing device, a test step written in the first programming language based upon the activation event; and inserting, by the server computing device, the generated test step into the first plurality of test steps.

18. The system of claim 16, wherein at least one of the first plurality of test steps comprises a template including a predefined sequence of test steps with an entry attribute and an exit attribute.

19. The system of claim 18, wherein the entry attribute relates to a test step that precedes the template in the ordered sequence of the first plurality of test steps.

20. The system of claim 18, wherein the exit attribute relates to a test step that follows the template in the ordered sequence of the first plurality of test steps.

21. The system of claim 15, wherein the server computing device is configured to update the identification of the one or more candidate test steps based upon a change to the selected one of the first plurality of test steps.

22. The system of claim 14, wherein the one or more user input elements include a method browser button, a variable declaration button, an assignment button, a control flow button, a template insertion button, and a source code insertion button.

23. The system of claim 14, wherein the first programming language is a line-oriented scripting language.

24. The system of claim 14, wherein the second programming language is Java.

25. The system of claim 14, wherein creating a test script using the automatically-generated source code comprises:
aggregating, by the server computing device, the automatically-generated source code into a test script file; and
storing, by the server computing device, the test script file in a database.

26. The system of claim 14, wherein a step of executing the test script against a plurality of mobile device applications comprises:
transmitting, by the server computing device, the test script to an automation engine computing device coupled to the server computing device and coupled to the plurality of mobile devices; and
executing, by the automation engine, the test script to control operation of the plurality of mobile device applications on the plurality of mobile devices, wherein execution of the test script at each of the plurality of mobile devices is synchronized.

27. A computer program product, tangibly embodied in a non-transitory computer readable storage device, for automated script creation and source code generation for testing mobile devices, the computer program product including instructions operable to cause a server computing device to:
generate a test script user interface for creating one or more test scripts, wherein the test script user interface comprises:
a first section for displaying a first plurality of test steps written in a first programming language, the first section including user input elements, wherein each of the first plurality of test steps corresponds to a programmatic method written in a second programming language;
a second section for displaying one or more properties of the programmatic method written in the second programming language that corresponds to a selected one of the first plurality of test steps;
a third section for displaying source code of the programmatic method written in the second programming language that corresponds to the selected one of the first plurality of test steps, the third section including user elements for editing the source code of the programmatic method; and
a fourth section for displaying a screen representation of a mobile device application under test;
generate the first plurality of test steps in an ordered sequence based upon activation of one or more of the user input elements;
receiving one or more text mapping files wherein the one or more text mapping files have references to the source code of a programmatic method in the second programming language that correspond to each of the first plurality of test steps;
creating an additional text mapping file corresponding to a programmatic method in the second language each time the programmatic method in the second language in brought into the system by choosing in a method editor interface;
automatically generate the source code of the programmatic method written in the second programming language for each of the first plurality of test steps upon generation of each of the first plurality of test steps, wherein the server computing device, for each test step:
parses the test step;
determines a text mapping the of the one or more text mapping files corresponding to the identity of the test step, wherein the text mapping the comprises a reference to the programmatic method written in the second programming language and the source code of the programmatic method written in the second programming language; and
generates a copy of the source code of the programmatic method written in the second programming language using the text mapping the;
create a test script using the automatically-generated source code; and
execute the test script against a plurality of mobile device applications on a plurality of mobile devices to test one or more functions of the mobile device applications.

* * * * *

UNITED STATES PATENT AND TRADEMARK OFFICE
CERTIFICATE OF CORRECTION

PATENT NO. : 10,235,280 B2
APPLICATION NO. : 15/484000
DATED : March 19, 2019
INVENTOR(S) : Dougherty et al.

Page 1 of 1

It is certified that error appears in the above-identified patent and that said Letters Patent is hereby corrected as shown below:

In the Claims

At Line 46 of Claim 27 (Column 18, Line 33), delete "text mapping the" and insert --text mapping file--

At Line 55 of Claim 27 (Column 18, Line 42), delete "text mapping the" and insert --text mapping file--

Signed and Sealed this
Thirtieth Day of July, 2019

Andrei Iancu
*Director of the United States Patent and Trademark Office*